United States Patent Office 3,787,569
Patented Jan. 22, 1974

3,787,569
2-p-NITRO- OR p-CHLOROBENZAMIDO-ACETOHYDROXAMIC ACID

Roland N. Johnson and Jon A. Anderson, Norwich, N.Y., assignors to Morton-Norwich Products, Inc.
No Drawing. Original application May 17, 1971, Ser. No. 144,322, now Patent No. 3,728,380. Divided and this application Aug. 14, 1972, Ser. No. 280,563
Int. Cl. A61k 21/00, 27/00
U.S. Cl. 424—229          1 Claim

ABSTRACT OF THE DISCLOSURE

Novel benzamidoacetohydroxamic acids of the formula:

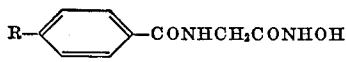

wherein R is nitro or chloro are potent inhibitors of urease. Combined with urinary tract antibacterials an improvement in the prevention of formation of urinary calculi in the presence of urea splitting organisms is observed.

---

This is a division of application Ser. No. 144,322, filed May 17, 1971, now U.S. Pat. No. 3,728,380.

This invention is concerned with chemical compounds. More particularly it is concerned with compounds of the formula:

wherein R is nitro or chloro and their combination with urinary tract antibacterial agents.

The compounds of Formula I are potent urease inhibitors. They may be readily prepared according to this scheme:

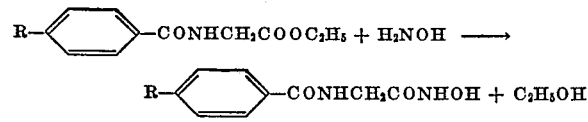

wherein R is nitro or chloro. Exemplary of this scheme are the following:

EXAMPLE 1

2-(p-nitrobenzamido)acetohydroxamic acid

A solution of hydroxylamine hydrochloride (28 g. 0.4 mole) in methanol (145 ml.) was treated with a solution of KOH (37 g. 0.7 mole) in methanol (84 ml.). The resulting inorganic salt was removed and the filtrate treated with ethyl p-nitrohippurate (84 g. 0.3 mole). After stirring for 3 hours, a solid precipitated. The entire reaction mass was stirred in approximately 500 ml. of water. A white crystalline solid was separated by filtration and dried at 60° to 35 g. The filtrate was acidified with glacial acetic acid to pH 6, precipitating a white crystalline solid which was dried at 60° to 38 g. The two crops were combined with 15 g. from a similar run and recrystallized from methanol to give 69 g. (67%), M.P. 160–1°.

Calcd. for $C_9H_9N_3O_5$: C, 45.19; H, 3.79; N, 17.57. Found: C, 45.10; H, 3.80; N, 17.53.

EXAMPLE 2

2-(p-chlorobenzamido)acetohydroxamic acid

Into a suspension of 209 g. (1.50 moles) of glycine ethyl ester hydrochloride in 1,200 ml. of dry benzene was slowly added 263 g. (1.50 moles) of p-chlorobenzoyl chloride. This mixture was heated under reflux for 22 hours, then filtered and the white precipitate was recrystallized from methanol giving 292 g. (82.5%) of ethyl 2-(p-chlorobenzamido)acetate, M.P. 114–117° C.

Analysis.—Calcd. for $C_{11}H_{12}NO_3Cl$ (241.67): C, 54.67; H, 5.01; N, 5.80. Found: C, 54.95; H, 4.97; N, 6.08.

To a stirred solution of 58 g. (0.83 mole) of hydroxylamine hydrochloride in 350 ml. of anhydrous methanol was added a solution of 70 g. of potassium hydroxide in 150 ml. of anhydrous methanol. A white salt immediately precipitated. This mixture was cooled in an ice bath and the salt was removed by filtration. The filtrate was placed into a 2 l. flask equipped with a stirrer, a thermometer and a drying tube. To the filtrate was added with stirring 100 g. (0.42 mole) of ethyl 2-(p-chlorobenzamido)acetate which went into solution. Approximately 2 minutes later a thick white precipitate formed. The mixture was stirred at room temperature overnight. The potassium salt was collected by filtration and dried at 60° to 90 g.

A second run of the same size was made with 91 g. of the potassium salt being obtained. The two crops of salt were combined making a total of 181 g. which was placed in 2,000 ml. of cold water. Glacial acetic acid (40 ml.) was added to give a final pH of 5. The white precipitate was collected by filtration and dried to 160 g. in a 60° oven. The 160 g. of crude product was recrystallized from 4,800 ml. of methanol. After cooling the solution overnight in the refrigerator, the product precipitated as white crystals which were collected by filtration and dried at 60° C. to 121 g. (63.8% overall yield), M.P. 171–172° C.

The anti-urease activity of the compounds of this invention is exemplified below:

TABLE 1

[The inhibition of urease purified from *Proteus mirabilis* (Pr-91) and of urease contained within intact cells of several species and strains of Proteus]

| | Concentration of inhibitor for 5 inhibition of urease | | | |
|---|---|---|---|---|
| | Compound of Ex. 1 | | Compound of Ex. 2 | |
| | Mole/liter | μg./l. | Mole/l. | μg./l. |
| Purified enzyme: | | | | |
| *Proteus mirabilis:* | | | | |
| Pr-91 | $5.3 \times 10^{-7}$ | 128 | $2.5 \times 10^{-7}$ | 57 |
| Intact cells: | | | | |
| *Proteus mirabilis:* | | | | |
| Pr-91 | $1.1 \times 10^{-6}$ | 264 | $3.6 \times 10^{-7}$ | 82 |
| Pr-104 | $1.3 \times 10^{-6}$ | 310 | $4.9 \times 10^{-7}$ | 112 |
| Pr-105 | $7.4 \times 10^{-7}$ | 178 | $3.6 \times 10^{-7}$ | 82 |
| Pr-92 | $2.2 \times 10^{-7}$ | 526 | $3.9 \times 10^{-7}$ | 89 |
| *Proteus vulgaris* | $2.9 \times 10^{-7}$ | 69 | $3.6 \times 10^{-7}$ | 82 |
| | $4.0 \times 10^{-7}$ | 96 | $3.5 \times 10^{-7}$ | 80 |
| *Proteus morgan:* | | | | |
| Pr-94 | $1.2 \times 10^{-6}$ | 286 | $2.9 \times 10^{-7}$ | 66 |
| Pr-100 | $6.2 \times 10^{-6}$ | 1,458 | $1.5 \times 10^{-6}$ | 342 |
| Pr-101 | $7.7 \times 10^{-7}$ | 184 | $3.3 \times 10^{-7}$ | 75 |

The compounds of this invention are valuable adjuncts in the therapy of urinary tract infection caused by urea splitting bacteria such as *Proteus mirabilis* whereby urea is decomposed to ammonia with resultant formation of insoluble salts such as ammonium magnesium phosphate giving rise to calculi formation and obstruction posing a site of reinfection impairing the efficacy of otherwise effective urinary tract antibacterials such as ampicillin, sulfamethoxazole and nitrofurantoin.

When the compounds of this invention are administered in conjunction with known antibacterial agents to rats in which *Proteus mirabilis* genitourinary tract infection has been induced, the appearance of calculi is diminished and sometimes prevented. Also, at times, dissolution of formed calculi is accomplished through this joint therapy.

The following table is illustrative of the beneficial result achieved through the concomitant therapy referred to above:

hydroxamic acid to ampicillin and sulfamethoxazole is 2:1 and to nitrofurantoin 10:1.

TABLE II

Calculi in Rats After 7 Days Infection with *Proteus mirabilis* (Pr-91)

[Compounds or combinations of compounds were administered t.i.d. at the indicated dosages for 6 days beginning 24 hours after infection]

| Compound(s) | Dosage, mg./kg. | Rats per group | Mean mg. phosphorus as calculi per bladder | Statistical significance of the difference between an experimental and the control group [1] | Test for potentiation [2] | |
|---|---|---|---|---|---|---|
| | | | | | EU | AB |
| None | None | 50 | 5.4 | | | |
| Sulfamethoxazole | 12.5 | 10 | 1.9 | .01 | | |
| Ampicillin | 12.5 | 9 | 1.1 | .05 | | |
| Nitrofurantoin | 2.5 | 9 | 2.2 | .02 | | |
| Compound of Example 1 | 25 | 10 | 3.3 | .02 | | |
| Do | 50 | 9 | 1.0 | .01 | | |
| Compound of Example 2 | 25 | 8 | 3.3 | .05 | | |
| Do | 50 | 7 | 2.3 | .02 | | |
| Compound of Example 1 plus sulfamethoxazole | 50 / 12.5 | 9 | 0.3 | .01 | .01 | .01 |
| Compound of Example 1 plus sulfamethoxazole | 25 / 12.5 | 9 | 0.6 | .01 | .01 | .01 |
| Compound of Example 2 plus sulfamethoxazole | 50 / 12.5 | 9 | 0.9 | 0.1 | .01 | .01 |
| Compound of Example 2 plus sulfamethoxazole | 25 / 12.5 | 9 | 0.9 | .01 | .01 | .01 |
| Compound of Example 1 plus nitrofurantoin | 50 / 2.5 | 10 | 0.3 | .01 | .01 | .01 |
| Compound of Example 1 plus nitrofurantoin | 25 / 2.5 | 10 | 1.2 | .01 | >.10 | >.10 |
| Compound of Example 2 plus nitrofurantoin | 50 / 2.5 | 9 | <0.1 | .01 | .01 | .01 |
| Compound of Example 2 plus nitrofurantoin | 25 / 2.5 | 10 | 0.8 | .01 | .01 | .01 |
| Compound of Example 1 plus Ampicillin | 50 / 12.5 | 10 | <0.1 | .01 | .01 | .01 |
| Compound of Example 1 plus Ampicillin | 25 / 12.5 | 20 | 0.2 | .10 | .10 | .10 |
| Compound of Example 2 plus Ampicillin | 50 / 12.5 | 9 | <0.1 | .01 | .01 | .01 |
| Compound of Example 2 plus Ampicillin | 25 / 12.5 | 10 | 0.1 | .10 | .01 | .01 |

[1] Statistical evaluation was by the Wilcoxon rank sum test [Wilcoxon et al. "Some Rapid Approximate Statistical Procedures," Lederle Laboratories, 7-9 (1964)].
[2] The number is the probability that the difference in the mean mg. phosphorus as cystic calculi between rats receiving an antibacterial agent (AB) only or an urease inhibitor (EU) only on the one hand, and the mean mg. phosphorus as cystic calculi from rats receiving both (AB) and (EU) on the other, is a chance occurrence.

The compounds of this invention by themselves and in conjunction with ampicillin, sulfamethoxazole or nitrofurantoin are readily formulated in pharmaceutical dosage forms such as tablets, lozenges, suspensions, troches, and capsules using conventional pharmaceutical carriers and excipients with which there is no incompatibility.

What is claimed is:

1. A composition for treating urinary tract infection caused by urea splitting Proteus organisms consisting of the combination of 2-(p-chlorobenzamido)acetohydroxamic acid and a member selected from the group consisting of ampicillin, sulfamethoxazole and nitrofurantoin in effective dosage amount in which the proportion of said hydroxamic acid to ampicillin and sulfamethoxazole is 2:1 and to nitrofurantoin 10:1.

References Cited

UNITED STATES PATENTS

| | | | |
|---|---|---|---|
| 2,279,560 | 4/1942 | Dietrich | 260—500.5 H |
| 2,279,973 | 4/1942 | Dietrich | 260—500.5 H |
| 3,634,509 | 1/1972 | Yates et al. | 260—500.5 H |
| 3,444,232 | 5/1969 | Bernstein | 260—500.5 H |

FOREIGN PATENTS 1,048,936  11/1966  Great Britain ____ 260—500.5 H

JEROME D. GOLDBERG, Primary Examiner

U.S. Cl. X.R.

424—271, 324

PO-1050
(5/69)

UNITED STATES PATENT OFFICE
CERTIFICATE OF CORRECTION

Patent No. 3,787,569                        Dated  January 22, 1974

Inventor(s)  Roland N. Johnson and Jon A. Andersen

It is certified that error appears in the above-identified patent and that said Letters Patent are hereby corrected as shown below:

Line 4: The name of the second inventor Jon A. "Anderson" should be Jon A. --Andersen--.

Signed and sealed this 14th day of May 1974.

(SEAL)
Attest:

EDWARD M. FLETCHER, JR.                C. MARSHALL DANN
Attesting Officer                      Commissioner of Patents